United States Patent [19]

Lin

[11] Patent Number: 5,357,709
[45] Date of Patent: Oct. 25, 1994

[54] APPARATUS FOR STORING A BAIT WHICH CONTAINS AN INSECTICIDAL INGREDIENT

[76] Inventor: Wen-Jen Lin, No. 120, Feng-Chou Rd., Feng-Yuan City, Taiwan

[21] Appl. No.: 58,413
[22] Filed: May 7, 1993
[51] Int. Cl.$^5$ .............................................. A01M 1/20
[52] U.S. Cl. ....................................................... 43/131
[58] Field of Search .................................. 43/131, 121

[56] References Cited

U.S. PATENT DOCUMENTS

| | | | |
|---|---|---|---|
| 1,700,517 | 1/1929 | Ross | 43/131 |
| 4,485,582 | 12/1984 | Morris | 43/131 |
| 4,563,836 | 1/1986 | Woodruff | 43/131 |
| 4,761,912 | 8/1988 | Dyer | 43/131 |
| 4,782,621 | 11/1988 | Wissman | 43/131 |
| 4,793,093 | 12/1988 | Gentile | 43/131 |
| 5,048,225 | 9/1991 | Brandli | 43/131 |
| 5,119,586 | 6/1992 | Townsend | 43/131 |
| 5,123,202 | 6/1992 | Tanisake | 43/131 |

Primary Examiner—Kurt C. Rowan
Attorney, Agent, or Firm—Knobbe, Martens, Olson & Bear

[57] ABSTRACT

An apparatus for storing a bait which contains an insecticidal ingredient is disclosed. The apparatus includes a flat seat having a hollow cylinder centrally fixed to the flat seat. A cover member rotatably caps the hollow cylinder. The cover member has a flange and a hook ring member depending from the lower face of the flange. The hook ring member retains a radial projection which is formed on the external surface of the hollow cylinder. The cover member has a plurality of openings or notches and the hollow cylinder has a plurality of holes. The holes and the openings can be registered with one another when the cover member is rotated to a predetermined position with respect to the flat seat.

2 Claims, 4 Drawing Sheets

APPARATUS FOR STORING A BAIT WHICH CONTAINS AN INSECTICIDAL INGREDIENT

BACKGROUND OF THE INVENTION

1. Field of the Invention

This invention relates to an apparatus for storing a bait which contains an insecticidal ingredient, more particularly to an apparatus for storing an insecticide-containing bait which is in the form of powder or pellets.

2. Description of the Related Art

Conventionally, baits which contain insecticidal ingredients are widely used for killing insects such as ants, cockroaches, etc. Such baits are usually made in the form of pellets or powder and are placed at some predetermined locations in a house where the insects often appear. There is a risk, however, of the baits being eaten by a young child who does not know the baits are poisonous.

SUMMARY OF THE INVENTION

It is therefore a main object of this invention to provide an apparatus for storing a bait which contains an insecticidal ingredient in order to protect young children from eating the bait.

Accordingly, the apparatus for storing a bait which contains an insecticidal ingredient of this invention, comprises:

a flat seat having a top face and a bottom face, a central recess formed in the top face, a hollow cylinder having an upper end and a lower end formed integrally in the central recess of the flat seat, the hollow cylinder having a plurality of circumferentially and equally spaced openings formed adjacent to the upper end of the hollow cylinder and a plurality of walls which define the respective openings in the hollow cylinder, each of the walls having a lower portion which is spaced a predetermined distance from the bottom face of the flat seat, the top face of the flat seat having first and second annular recesses formed concentrically adjacent to an external surface of the hollow cylinder in a consecutive relationship, the first annular recess having an inside diameter identical to the outside diameter of the second annular recess, the second annular recess being deeper than the first annular recess, the external surface of the hollow cylinder having a radial projection extending into the second annular recess at a level so that it is adjacent to the top face of the flat seat, the flat seat having a guiding face with a slope inclined downward from the top face adjacent to the first annular recess toward the bottom face at the outer periphery of the flat seat; and a cover member having a cylindrical member which covers rotatably the hollow cylinder, the cylindrical member having an upper closed end and a lower open end, the lower open end having an outwardly extending annular flange which is inclined downward in a slope identical to the slope of the guiding face of the flat seat, the annular flange having an outside diameter which is identical to the outside diameter of the first annular recess, the annular flange having an inclined upper face and an inclined lower face which is parallel to the upper inclined face, the lower face having a positioning ring member depending from the outer periphery of the annular flange and a hook ring member which is L-shaped in cross section and depends from the lower inclined face between the outer periphery and the inner periphery of the annular flange, the hook ring member and the inclined lower face of the annular flange together defining an annular receiving groove which opens inwardly, the positioning ring member being inserted into the first annular recess, the hook ring member extending into the second annular recess, the radial projection of the hollow cylinder extending into the annular receiving groove so that the cover member can be rotatably retained relative to the flat seat, the cylindrical member having a plurality of holes registered correspondingly with the openings of the hollow cylinder when the cover member is rotated to a predetermined position with respect to the hollow cylinder.

Other features and advantages of this invention will become apparent in the following detailed description of the preferred embodiments of this invention with reference to the accompanying drawings.

DETAILED DESCRIPTION OF THE PREFERRED EMBODIMENTS

Figure 1:
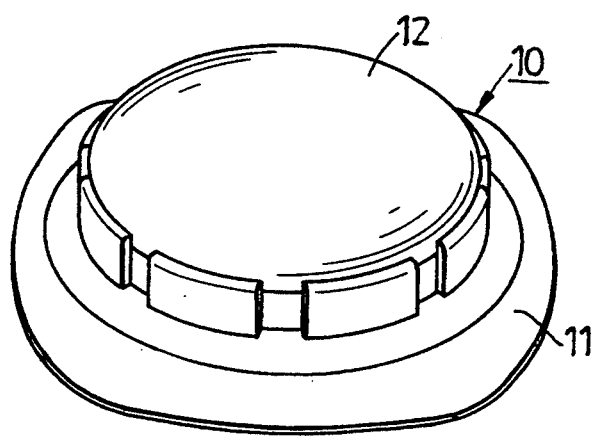
FIG. 1 is a perspective view of a preferred embodiment of an apparatus for storing a bait which contains an insecticide ingredient of this invention.

FIG. 1 shows a preferred embodiment of an apparatus 10 for receiving a bait which contains an insecticidal ingredient of this invention. The apparatus 10 includes a flat seat 11 and a cover member 12 rotatably retained on the flat seat 11.

Figure 2:
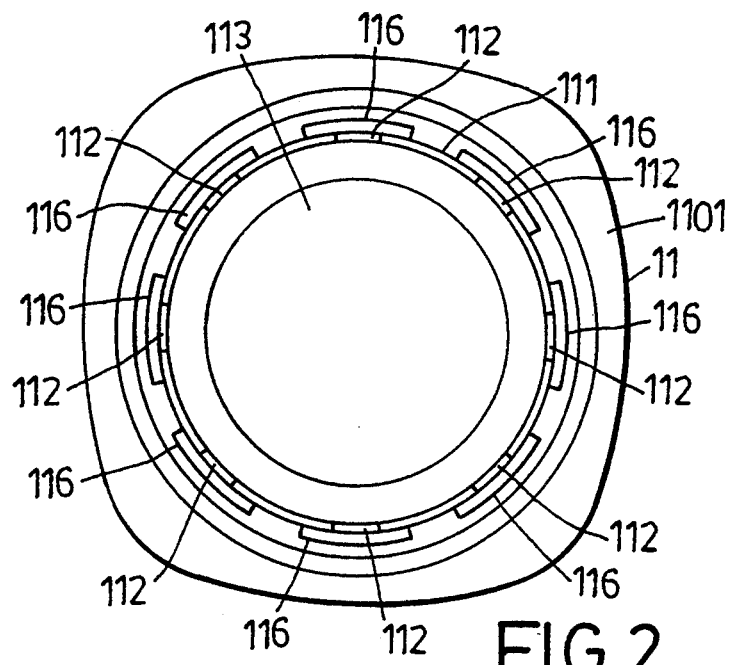
FIG. 2 is a top view of the preferred embodiment of a flat seat of the apparatus for storing a bait of this invention.
Figure 3:
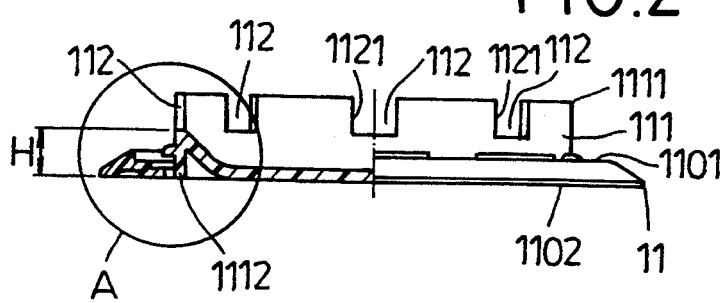
FIG. 3 is a partially sectional side view of the flat seat of the apparatus for storing a bait of this invention.

FIG. 2 shows a top view of the flat seat 11 of the apparatus 10 for receiving a bait of this invention. The flat seat 11 has a central recess 113 formed in the top face 1101 of the flat seat 11. A hollow cylinder 111 has an upper end 1111 and a lower end 1112 formed integrally with the bottom of the central recess 113 of the flat seat 11, as best illustrated in FIG. 3. The hollow cylinder 111 has eight circumferentially and equally spaced notches 112 formed in the upper end 1111 of the hollow cylinder 111 and corresponding walls 1121 which defines the respective notches 112 in the hollow cylinder 111. Each of the walls 1121 has a lower portion which is spaced a predetermined distance (H) from the bottom face 1102 of the flat seat 11.

Figure 4:
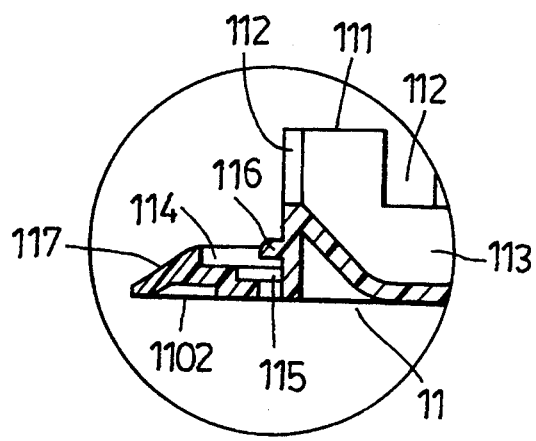
FIG. 4 is an enlarged view of the circle A of FIG. 3.

Referring to FIGS. 2 and 3, the top face 1101 of the flat seat 11 has first and second annular recesses, 114 and 115, which are formed concentrically and adjacent to an external surface of the hollow cylinder 111 in a consecutive relationship. The inside diameter of the first annular recess 114 is identical to the outside diameter of the second annular recess 115. The second annular recess 115 is deeper than the first annular recess 114. The external surface of the hollow cylinder 111 has eight radial projections 116 extending into the second annular recess 115 at a level which is adjacent to the top face 1101 of the flat seat 11. The radial projections 116 are equally spaced and are below their respective notches 112. The flat seat 11 has a guiding face 117 with a slope inclined downward from the top face 1101 adjacent to the first annular recess 114 toward the bottom face 11102 at the outer periphery of the flat seat 11, as best illustrated in FIG. 4.

Figure 5:
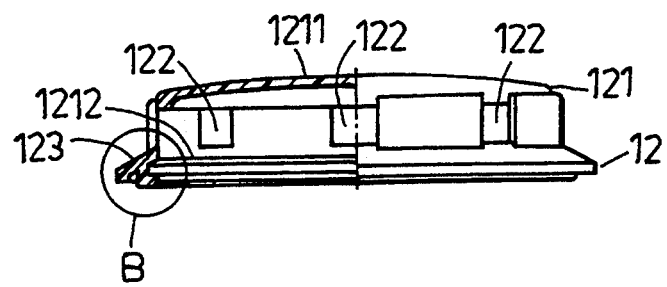
FIG. 5 is a partial sectional side view of the cover member of the preferred embodiment of the apparatus for storing a bait of this invention.
Figure 6:
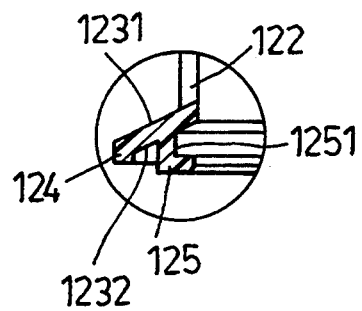
FIG. 6 is an enlarged view of the circle B of FIG. 5.
Figure 7:
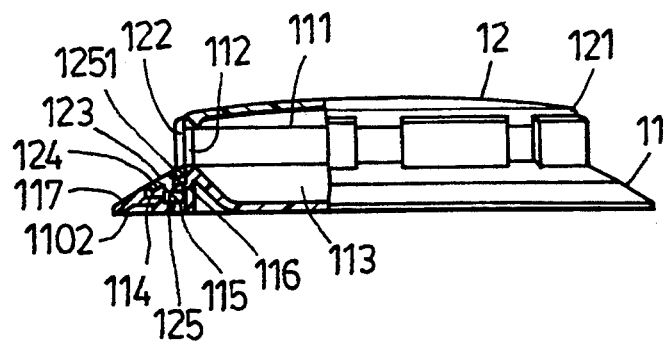
FIG. 7 is a partial sectional side view of the preferred embodiment of the apparatus for storing a bait of this invention.

Referring to FIGS. 5 and 7, the cover member 12 has a cylindrical member 121 which can rotatably cap the hollow cylinder 111. The cylindrical member 121 has an upper closed end 1211 and a lower open end 1212. The lower open end 1212 has an outwardly extending annular flange 123 which is inclined downwardly in a slope that is identical to the slope of the guiding face 117 of the flat seat 11. The outside diameter of the annular flange 123 is identical to the outside diameter of the first annular recess 114. The annular flange 123 has an inclined upper face 1231 and an inclined lower face 1232 which is parallelled with the upper inclined face 1231, as best illustrated in FIG. 6. The lower face 1232 has a positioning ring member 124 which depends from the outer periphery of the annular flange 123 and a hook ring member 125 which is L-shaped in cross section and depends from the lower inclined face 1232 between the outer periphery and an inner periphery of the annular flange 132. The hook ring member 125 and the inclined lower face 1232 of the annular flange 123 together define an annular receiving groove 1251 inside of the cylindrical member 121, as best illustrated in FIG. 6. The positioning ring member 124 is inserted in the first annular recess 114 and rests on the bottom of the first annular recess 114. Therefore, the cover member 12 can be stably positioned in the first annular recess 114 of the flat seat 11 when the cover member 12 is rotated relative to the flat seat 11. The hook ring member 125 extends into the second annular recess 115 and the radial projections 116 of the hollow cylinder 111 extend into the annular receiving groove 1251. The cover member 12 can thereby be rotatably retained relative to the flat seat 11, as best illustrated in FIG. 7. The cylindrical member 121 has eight holes 122 registered correspondingly with the notches 112 of the hollow cylinder 111 when the cover member 11 is rotated to a predetermined position with respect to the hollow cylinder 111. The inclined upper face 1231 of the cover member 12 and the guiding face 117 of the flat seat 11 together define an annular inclined face from the lower portion of the holes 122 to the bottom face 1102. The annular inclined face allows the insects, such as ants and cockroaches, to climb into the hollow cylinder 111 through the holes 122 of the cover member 12 and the notches 112 when the cover is mounted to the flat seat 11 and rotated to the predetermined position.

It is noted that cover member 12 is made of a flexible material. Therefore, the hook ring member 125 of the cover member 12 can be bent in order to detach from the radial projections 116 of the hollow cylinder 111. A bait which contains an insecticidal ingredient may be placed in the central recess 113 before the cover member 12 is mounted to the flat seat 11.

Figure 8:
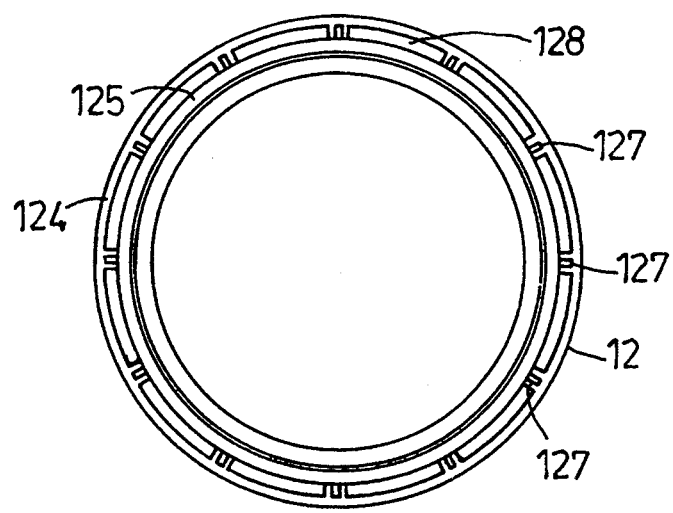
FIG. 8 is a bottom view of the cover member of a second preferred embodiment of the apparatus for storing a bait of this invention.
Figure 9:
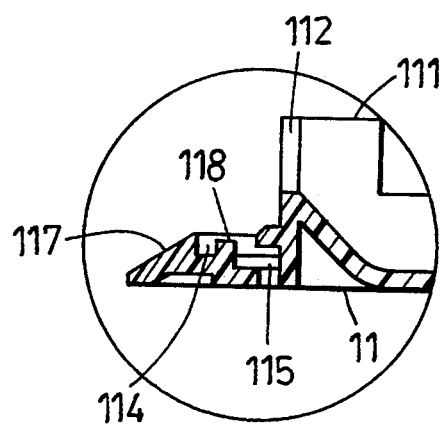
FIG. 9 is a partially sectional side view of the second preferred embodiment of the apparatus for storing a bait of this invention.
Figure 10:
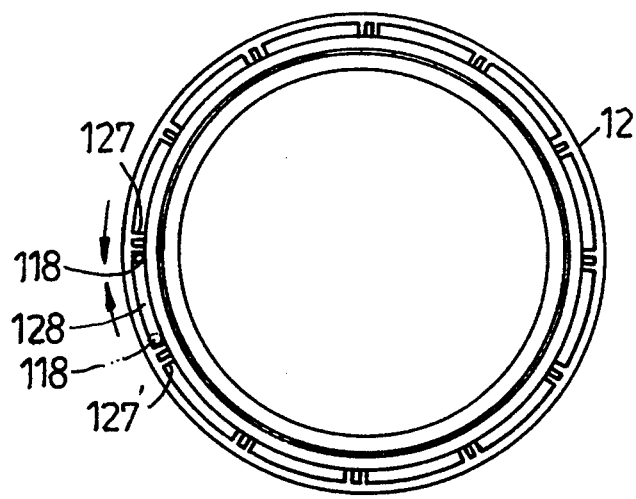
FIG. 10 is a schematic view illustrating the cover member and the flat seat of the second preferred embodiment of the apparatus for storing a bait of this invention being rotated relative to one another.

FIG. 8 shows a bottom view of a cover member 12 of a second preferred embodiment of the apparatus for storing a bait of this invention. In this embodiment, the structure of the cover member 12 and the flat seat 11 is similar to that of the first embodiment except that a plurality of equally spaced ribs 127 are connected between the positioning ring member 124 and the hook ring member 125 of the annular flange 123 of the cover member 12 and a protrusion 118 is formed on the bottom of the first annular recess 114, as best illustrated in FIG. 9. A plurality of partitions 128 are defined between the ribs 127. The protrusion 118 extends into one of the partitions 128 of the annular flange 123. FIG. 10 illustrates the cover member 12 and the flat seat 11 of the second preferred embodiment of the apparatus for storing a bait of this invention as they are rotated relative to one another. The protrusion 118 is stopped by one of the ribs 127 when the cover member 12 is rotated counterclockwise to the predetermined position, thereby allowing the notches 112 of the hollow cylinder 111 to register in the holes 122 of the cylindrical member 121. In reverse, the protrusion 118 is stopped by an adjacent rib 127 when the cover member 12 is rotated clockwise, allowing the notches 112 to misalign with the holes 122 and thereby causing the notches 112 to be closed by the wall of the cylindrical member 121. Therefore, the apparatus for storing a bait of this invention can guard against young children accidentally eating the bait.

With this invention thus explained, it is apparent that numerous modifications and variations can be made without departing from the scope and spirit of this invention. It is therefore intended that this invention be limited only as indicated in the appended claims.

I claim:

1. An apparatus for storing a bait which contains an insecticidal ingredient, said apparatus comprising:

a flat seat having a top face and a bottom face, a central recess formed in said top face, a hollow cylinder having an upper end and a lower end formed integrally in said central recess of said flat seat, said hollow cylinder having a plurality of circumferentially and equally spaced notches formed adjacent to said upper end of said hollow cylinder and a plurality of walls which defines the respective openings in said hollow cylinder, said top face of said flat seat having first and second annular recesses concentrically formed and adjacent to an external surface of said hollow cylinder in a consecutive relationship, said first annular recess having an inside diameter identical to an outside diameter of said second annular recess, said second annular recess being deeper than said first annular recess, said external surface of said hollow cylinder having a radial projection which extends into said second annular recess at a level which is adjacent to said top face of said flat seat, said flat seat having a guiding face with a slope inclined downward from said top face adjacent to said first annular recess and toward said bottom face at an outer periphery of said flat seat; and a cover member having a cylindrical member which caps rotatably said hollow cylinder, said cylindrical member having an upper closed end and a lower open end, said lower open end having an outwardly extending annular flange which is inclined downward in a slope identical to said slope of said guiding face of said flat seat, said annular flange having an outside diameter which is identical to an outside diameter of said first annular recess, said annular flange having an inclined upper face and an inclined lower face which is parallel with said upper inclined face, said lower face having a positioning ring member depending from an outer periphery of said annular flange and a hook ring member which is L-shaped in cross section which depends from said inclined lower face between the outer periphery and an inner periphery of said annular flange, said hook ring member and said inclined lower face of said annular flange together defining an annular receiving groove, said positioning ring member being inserted in said first annular recess, said hook ring member extending into said second annular recess, said radial projection of said hollow cylinder extending into said annular receiving groove so that said cover member can be rotatably retained relative to said flat seat, said cylindrical member having a plurality of holes registered correspondingly with said openings of said hollow cylinder when said cover member is rotated to a predetermined position with respect to said hollow cylinder.

2. An apparatus as claimed in claim 1, wherein said positioning ring member and said hook ring member of said annular flange have a plurality of equally spaced ribs connected therebetween and a plurality of partitions formed between said ribs, and a protrusion being formed on a bottom of said first annular recess and extending into one of said partitions of said annular flange, whereby said protrusion is stopped by one of said ribs when said cover member is rotated to said predetermined position, allowing said openings of said hollow cylinder to register in said holes of said cylindrical member, and whereby said protrusion is stopped by an adjacent rib when said cover member is rotated, causing said openings to misalign with said holes and, thereby allowing said openings to be closed by said cylindrical member.

* * * * *